US 6,450,959 B1

(12) United States Patent
Mo et al.

(10) Patent No.: US 6,450,959 B1
(45) Date of Patent: Sep. 17, 2002

(54) ULTRASOUND B-MODE AND DOPPLER FLOW IMAGING

(75) Inventors: Larry Y. L. Mo, Waukesha; Michael J. Washburn; Stephen Mark Peshman, both of New Berlin, all of WI (US)

(73) Assignee: GE Medical Systems Global Technology Company, Waukesha, WI (US)

( * ) Notice: Subject to any disclaimer, the term of this patent is extended or adjusted under 35 U.S.C. 154(b) by 0 days.

(21) Appl. No.: 09/533,445

(22) Filed: Mar. 23, 2000

(51) Int. Cl.[7] .................................................. A61B 8/00
(52) U.S. Cl. ........................ 600/441; 600/455; 600/456; 128/916
(58) Field of Search ................................. 600/456, 455, 600/441, 413, 443

(56) References Cited

U.S. PATENT DOCUMENTS

| | | | |
|---|---|---|---|
| 4,476,874 A | * 10/1984 | Taenzer et al. | 600/441 |
| 4,501,277 A | * 2/1985 | Hongo | 600/441 |
| 5,365,929 A | * 11/1994 | Peterson | 600/456 |
| 5,383,463 A | * 1/1995 | Friedman | 600/455 |
| 5,419,332 A | * 5/1995 | Sabbah et al. | 600/455 |
| 5,724,974 A | 3/1998 | Goodsell, Jr. et al. | |
| 5,785,655 A | * 7/1998 | Goodsell, Jr. et al. | 600/441 |

FOREIGN PATENT DOCUMENTS

WO     WO 98/28631     8/1998

OTHER PUBLICATIONS

Tortoli et al., *Blood Flow Images by a SAW–Based Multigate Doppler System*, IEEE Transactions on Ultrasonics, Ferroelectrics and Frequency Control, vol. 35, No. 5, pp. 545–551.
Spectral Velocity Profiles for Detailed Ultrasound Flow Analysis, Piero Tortoli, Francesco Guidi, Gabriele Guidi and Carlo Atzeni (EEE Transactions on Ultrasonics, Ferroelectrics, and Frequency Control); vol. 43, No. 4, Jul. 1996, pp. 654–659.

* cited by examiner

*Primary Examiner*—Marvin M. Lateef
*Assistant Examiner*—Ruby Jain
(74) *Attorney, Agent, or Firm*—McAndrews, Held & Malloy, Ltd.; Peter J. Vogel; Michael A. Dellapenna

(57) ABSTRACT

An ultrasound scanning system (10) includes a plurality of range gates (71–74) responsive to ultrasound waves for generating a plurality of Doppler signal samples representing different depth increments within a subject (S) being studied. A logic unit (30) generates Doppler frequency signals and generates B-mode data. A display (60) generates a B-mode image and a Doppler image which may be superimposed on the B-mode image. The Doppler image (DI) is arranged to illustrate depth increments within the subject being studied versus Doppler velocity or frequency.

10 Claims, 4 Drawing Sheets ical line in the frequency versus time spectrogram display, in which the intensity (or color) is modulated by the spectral magnitude. The Doppler frequency shift $f_d$, is often converted into flow velocity (speed) v, based on the Doppler equation: $v=cf_d/(2f_o \cos \theta)$, where $f_o$ is the transmit frequency, and $\theta$ is the Doppler angle, or angle between the ultrasound beam and the velocity vector.

The advantage of the conventional spectral Doppler technique described above is that it provides a continuous display of the Doppler spectral distribution as it evolves over the cardiac cycle, from which many diagnostic waveform indices such as the systolic-to-diastolic ratio, are derived. The limitation is that only the Doppler frequency distribution within a single sample volume can be measured. It is not possible to simultaneously observe how the flow velocities are changing in two or more sample volumes across the vessel diameter.

Tortoli et al. taught in ("Spectral velocity profiles for detailed ultrasound flow analysis" IEEE Trans. UFFC, vol. 43, pp. 654–659, 1996) the operation of a multi-gate Doppler system for measuring the time-varying flow velocity profiles along a Doppler beam. The system is capable of computing in real-time the FFT of Doppler signals detected from 64 equally spaced range gates. The resultant data is displayed in a range versus velocity/frequency format where the gray scale intensity is modulated by spectral power. These spectral Doppler profiles provide a direct and intuitive representation of the pulsatile flow velocity profile across the blood vessel. However, no background tissue anatomical data is available.

Today's premium ultrasound scanners are generally capable of simultaneous acquisition of single-range-gate spectral Doppler and B-mode data. To maximize frame rate, usually a part or entire frame of B-vectors are interleaved with the Doppler firings. If Doppler needs to be suspended during the B-mode interval in order to maintain an acceptable B-mode frame rate, a time gap will occur in the Doppler data and is usually filled in with synthesized Doppler data.

A scanner which can acquire, process and display B-mode and multi-gate spectral Doppler flow images simultaneously would clearly provide a new useful tool for vascular diagnosis. It will be especially interesting to be able to monitor the flow profile changes in conjunction with vessel wall movements over the cardiac cycle.

BRIEF SUMMARY OF THE INVENTION

The preferred embodiments are useful in an ultrasound system for acquiring and displaying Doppler and B-mode data from a subject under study. In such an environment, ultrasound waves are transmitted into the subject under study, preferably by an ultrasound transmitter. Backscattered signals are generated in response to the ultrasound waves backscattered from the subject under study, preferably by a receiver.

A plurality of Doppler signal samples representing different depth increments within the subject are generated, preferably by a plurality of range gates responsive to the backscattered signals. A plurality of Doppler frequency signals representing the different depth increments are generated in response to the Doppler signal samples, preferably by a logic unit. B-mode data is generated in response to the backscattered signals, preferably by the logic unit. A B-mode image is displayed in response to the B-mode data and a Doppler image is displayed representing the Doppler frequency along a first axis and representing the depth increments along a second axis in response to the Doppler frequency signals.

By using the foregoing techniques, B-mode and Doppler information can be displayed in a manner which facilitates interpretation and diagnosis by ultrasound users.

DETAILED DESCRIPTION OF THE INVENTION

The preferred embodiments pertain mainly to new data acquisition and display methods and apparatus for simultaneous B-mode and multi-gate spectral Doppler imaging by an ultrasound scanner system 10. Neither B-mode nor multi-gate Doppler processing is new by itself. Both can be implemented in hardware and/or software.

As a result, the preferred embodiments also can be implemented in hardware and/or software and are not limited to a particular platform implementation.

Figure 1:
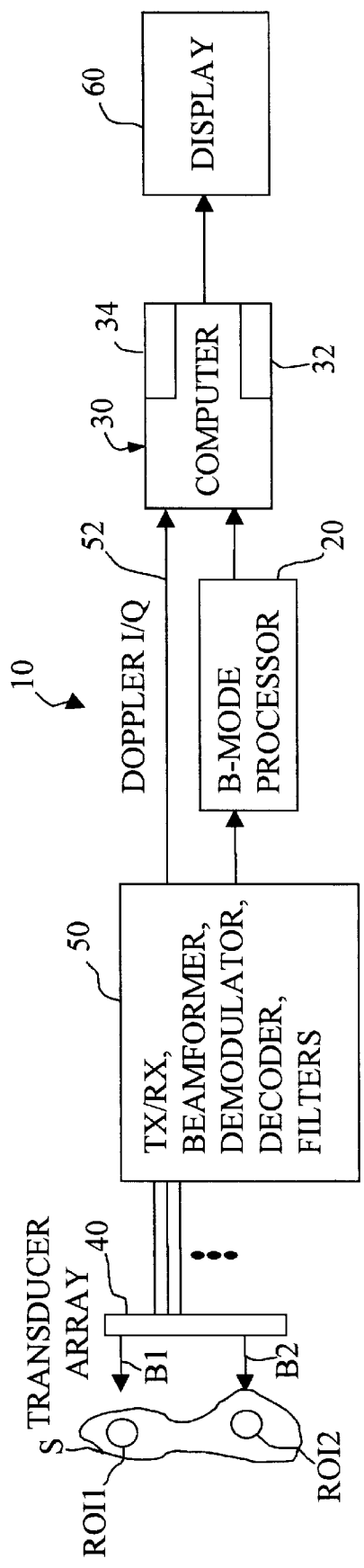
FIG. 1 is a schematic block diagram of a preferred form of the invention.

In the preferred embodiment shown in FIG. 1, the B-mode data processing is implemented in a dedicated B-mode logic unit in the form of a processor 20, while the multi-gate processing of Doppler I/Q data, and all the B-mode post-processing (scan conversion, video processing) are effected on another logic unit in the form of a programmable computer 30. Logic units 20 and 30 can be implemented by a variety of devices, including microprocessors, digital signal processors or application specific integrated circuits capable of logical and arithmetic operations.

The "front-end" of the scanner system 10 in FIG. 1 includes an ultrasound transducer array 40 and a transmitter (Tx), receiver (Rx), Tx/Rx beamformer, demodulator, decoder and filter module 50. Array 40 acts as a transmitter of ultrasound waves into a subject under study S. Ultrasound waves are backscattered from subject S in a well known manner. The demodulator within module 50 shifts the received RF data (i.e., ultrasound waves) into baseband to produce the in-phase (I) and quadrature (Q) components for Doppler processing on a bus 52. Some noise filters may be further applied to reject out of band noise. If coded excitation techniques are used, as taught in U.S. Pat. No. 5,964,706, issued Oct. 12, 1999 in the names of Mo and Chiao, entitled "Method and Apparatus for pulsed Doppler Imaging With Coded Excitation On Transmit And Pulse Compression On Receive," a decoder will be needed to effect pulse compression either before or after demodulation. Pulse compression may be especially useful for multi-gate spectral Doppler since it can help achieve the highest range resolution without comprising sensitivity as would occur if an uncoded long transmit burst is used.

B-mode data is generated from the backscattered ultrasound waves by conventional envelope detection and logarithmic compression techniques in processor 20. The B-mode data is organized into frames of data at a predetermined frame rate by computer 30 in a well known manner. As shown in more detail in connection with FIG. 5, the B-mode data resulting from one region of interest within subject S may be processed at one frame rate, and the B-mode data resulting from a second region of interest with subject S may be processed at a second frame rate different from the first frame rate.

Both B-mode data and Doppler signals may be converted to images and displayed on a display unit 60 by well known techniques.

Simultaneous B-mode and Spectral Doppler Flow Imaging

In general, scanner system 10 needs to alternate between ultrasound B-mode and Doppler firings to achieve simultaneous anatomical and spectral Doppler flow imaging. For deep imaging, the two types of firing may be interleaved to achieve continuous data acquisition in both modes. For shallower applications where such interleaving is no longer possible, the Doppler acquisition will be suspended during the B-mode imaging intervals, as in conventional duplex scanning. B-mode data processing is well-known and need not be further described.

Figure 2:
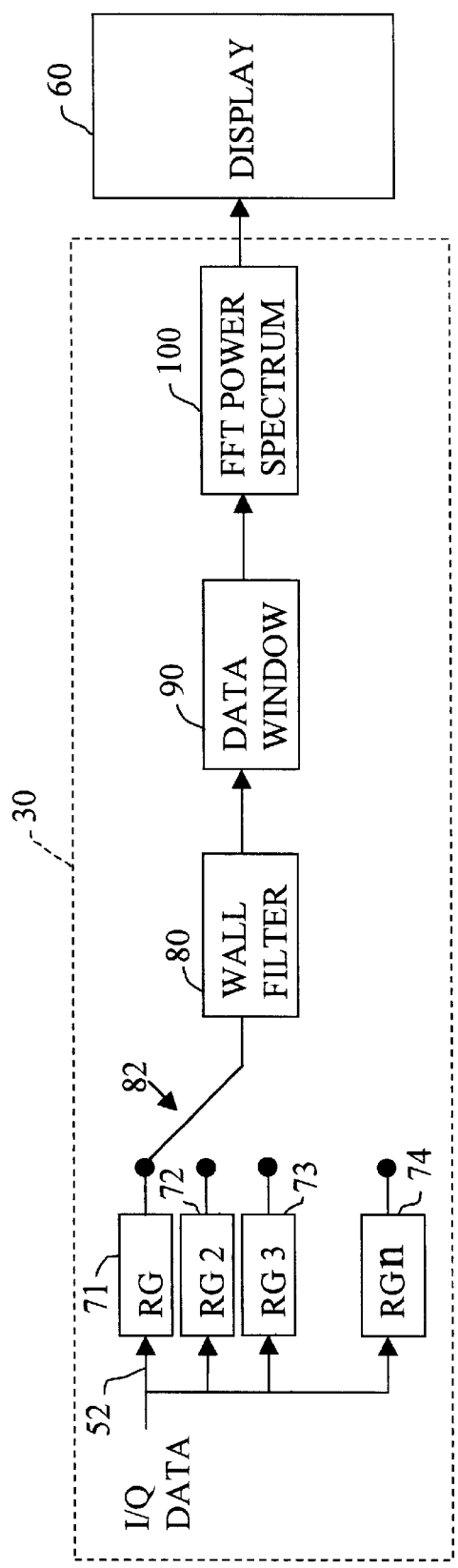
FIG. 2 is a schematic block diagram and functional diagram of a preferred form of Doppler apparatus and processing according to a preferred form of the invention.

Multi-gate spectral Doppler processing is described in FIG. 2. The key step is to apply different range gates, such as gates 71–74, which represent different depth increments within subject S, to the decoded Doppler I/Q data on bus 52. Each range gate is basically a "sum and dump" operation that produces a Doppler signal sample at the pulse repetition frequency (PRF) of the ultrasound waves generated by array 40.

Each Doppler signal sample represents a different depth increment with subject S. The rest of the processing for each range gate output is the same as in a conventional single-gate pulsed Doppler system. The "slow time" Doppler data (sampled at PRF) is passed through a wall filter function 80, windowed in a data window function 90 and then transformed via a fast Fourier transform (FFT) in a power spectrum function 100 to generate Doppler frequency signals which then are compressed in amplitude based on a typical display dynamic range of 30–40 dB. Each range gate produces a spectral line at its corresponding range which represents a depth increment in subject S. The range gates are coupled to wall filter function 80 by a multiplex function schematically represented by a switch 82. All functions within box 30 in FIG. 2 may be implemented by computer 30.

B-mode and Spectral Flow Images in Different Display Windows

Figure 3:
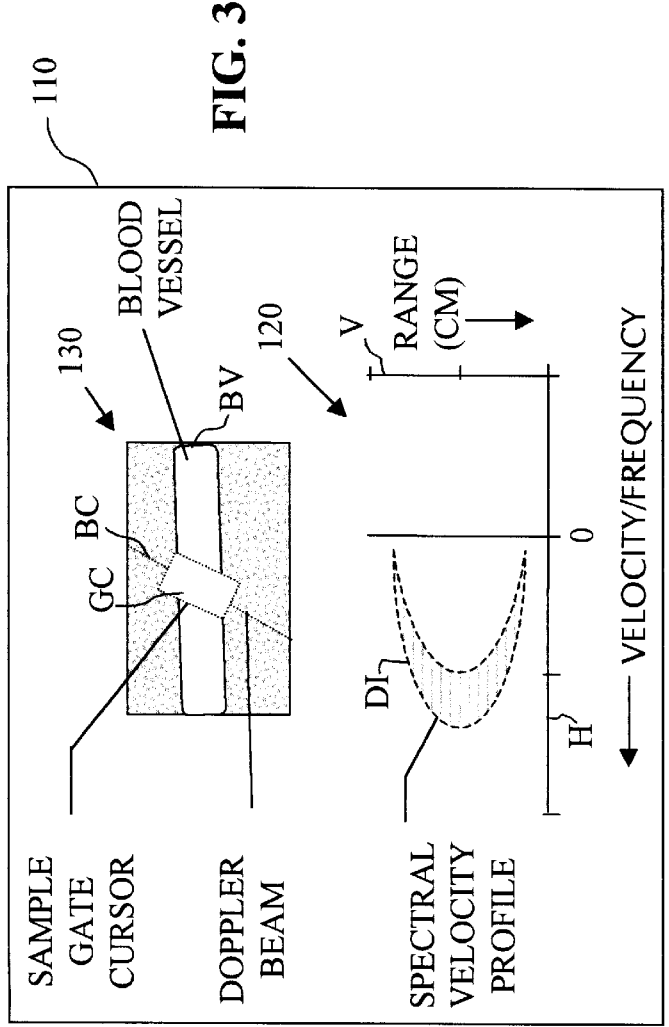
FIG. 3 is a schematic diagram of one form of display for the invention.

FIG. 3 represents one form of display on a face 110 of display 60. A Doppler image DI representing the Doppler frequency signals is displayed in a portion 120 of face 110 in which a vertical axis V represents range position (i.e., depth increment within subject S) and a horizontal axis H represents Doppler shift frequency or velocity. (In this specification, Doppler velocity is considered to be a form of Doppler frequency.) A conventional B-mode image derived from the B-mode data in a conventional manner is displayed in a portion 130 of face 110. Portion 130 displays an image of a blood vessel BV. A spectrum display box DB corresponding to gate cursor GC is superimposed on the blood vessel image in order to indicate the range of depth increments in subject S represented by the Doppler image DI. A Doppler beam cursor BC is superimposed on the display in order to represent the direction of the Doppler beams generated by array 40.

In this dual mode of display, even if the Doppler firings need to be suspended in order to maintain a good B-mode frame rate, there is no a need for a "Doppler gap filler" for the video display on face 110. Time gaps in the Doppler data set translate simply into a lower frame rate for the spectral flow imaging.

As in conventional spectral display, the maximum and mean velocity/frequency traces can be superposed on the same spectral flow data, except these traces will run vertically over depth. These traces can also be displayed by themselves without the spectral flow data, and they are potentially useful for quantitative velocity measurements such as mean velocity and shear rate/shear stress.

Superpose Spectral Flow Data onto B-image

Figure 4:
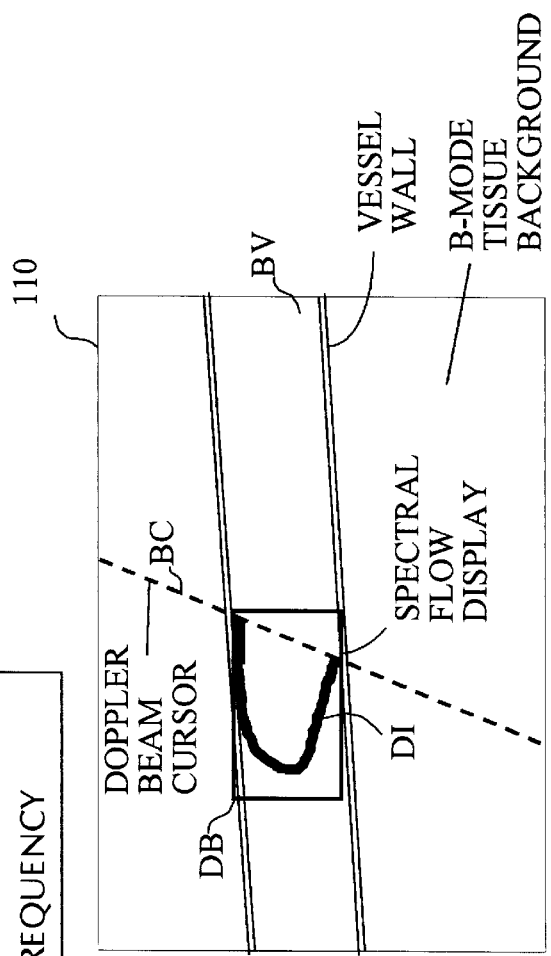
FIG. 4 is a schematic diagram of a preferred form of display for the invention.

According to the preferred display embodiment of the invention, the spectral flow data is encoded via a gray or color map, which is then superposed onto the B-image as shown in FIG. 4 in portion 130 of face 110. A graphics overlay may be used for the spectral flow data in the video display.

Figure 5:
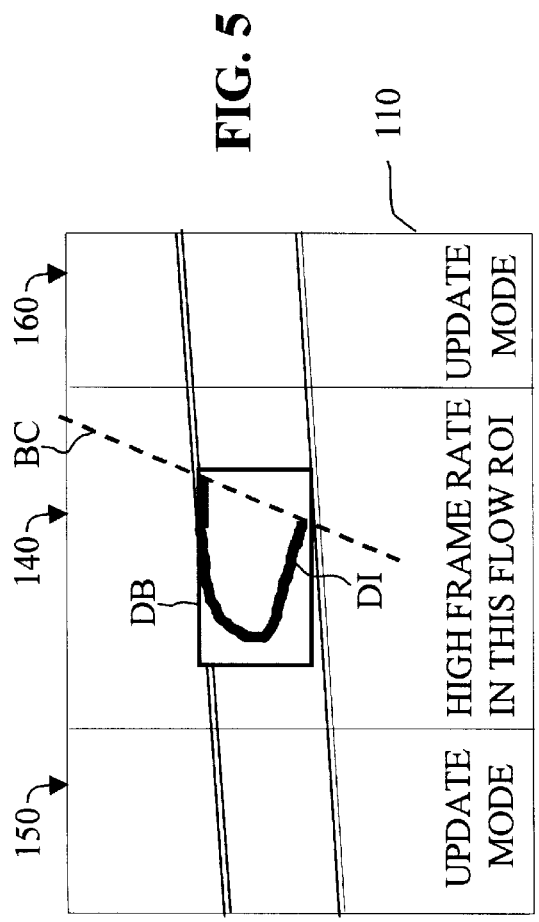
FIG. 5 is a schematic diagram of the type of display shown in FIG. 4 illustrating a preferred form of processing at different frame rates.

According to another embodiment of the invention shown in FIG. 5, to maximize the B-mode frame rate in region of interest 140 immediately surrounding the spectrum display box DB, the "outer" or peripheral image regions, such as regions 150 and 160 (FIG. 5) can be either frozen or just updated occasionally as in conventional update mode.

Simultaneous B-mode and Multiple Multi-gated Spectral Doppler Imaging

According to another embodiment of the invention, two or more independent Doppler beams are generated by the transmitter array 40 to sample different vessel locations (e.g. proximal and distal to an arterial stenosis). The Doppler signal samples resulting from the different Doppler beams are multi-gated and processed separately to produce the corresponding spectral flow data and corresponding different Doppler frequency signals. If the Doppler PRFs of the different Doppler beams are sufficiently low, it may be possible to alternate between the different Doppler beam firings, for simultaneous multiple multi-gated Doppler velocity measurements. In this case, two or more parallel Doppler processing pipelines like that of FIG. 2 may be needed.

More specifically, ultrasound waves are generated by array 40 in the form of a first Doppler beam B1 directed to a first region of interest ROI 1 within subject S and a second Doppler beam B2 directed to a second region of interest ROI 2 within subject S. A first group of backscattered waves from ROI 1 are used by module 50 to generate a first group of backscattered signals, and a second group of backscattered waves from ROI 2 are used by module 50 generate a second group of backscattered signals. A first group of Doppler signal samples are generated by computer 30 in response to said first group of backscattered signals and a second group of Doppler signals are generated by computer 30 in response to the second group of backscattered signals. A first plurality of Doppler frequency signals are generated by computer 30 in response to said first group of Doppler signal samples and a second plurality of Doppler frequency signals generated by computer 30 in response to said second group of Doppler signal samples.

If interleaving is not possible, then the flow data can be acquired and processed one Doppler beam at a time together with an external trigger signal such as an electrocardiogram (ECG) signal. The Doppler I/Q data on bus 52 for each Doppler beam and the corresponding ECG data can be held in a buffer memory 32 of computer 30. While scanner 10 is acquiring a second set of Doppler I/Q data (from another Doppler beam), the first set of I/Q Doppler data can be processed (FIG. 2) and the result can be stored in another buffer memory 34. When all the data from multiple Doppler beams have been acquired, the display can be generated via post-processing in which the spectral flow data from different beams are synchronized based on the cardiac timing ECG signal. To obtain the background anatomical image, at least one set of B-mode frames also will need to be acquired before repeating the multiple Doppler firing sets.

Figure 6:
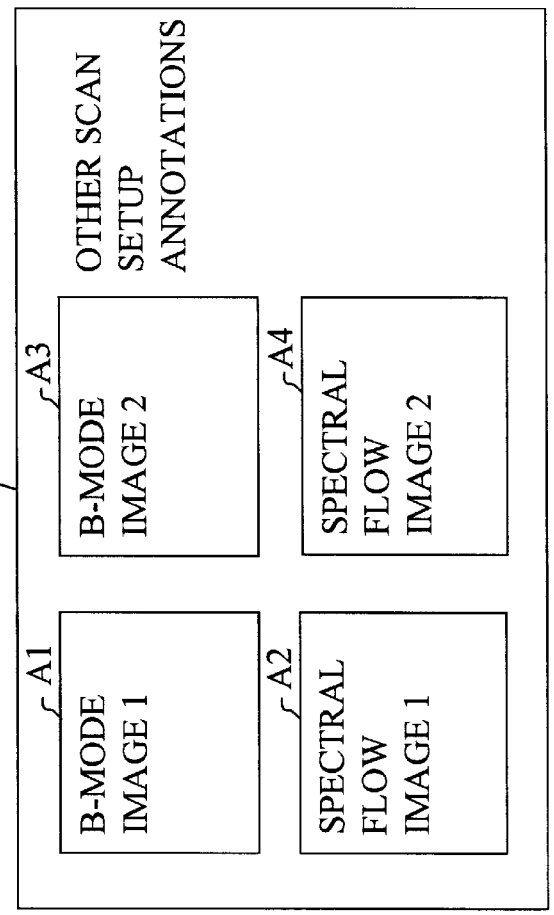
FIG. 6 is a schematic diagram illustrating one form of display for an embodiment of the invention using two different transmit beams.

Referring to FIG. 6, according to another display embodiment of the invention useful for two or more Doppler beams, additional but smaller windows are used to display the multiple multi-gated Doppler and B-mode data. If there are only two sets of B-mode and Doppler data, a split screen display format with, for example, area A1 and area A2 on the left side, and area A3 and area A4 on the right side of display face 110 may be used to display information. In such an arrangement, a B-mode image resulting from beam B1 (similar to the image in area 130 (FIG. 3)) is displayed in area A1 and a corresponding Doppler image resulting from beam B1 (similar to the image in area 120 (FIG. 3)) is displayed in area A2. A B-mode image resulting from beam B2 (similar to the image in area 130 (FIG. 3)) is displayed in area A3 and a corresponding Doppler image resulting from beam B2 (similar to the image in area 120 (FIG. 3)) is displayed in area A4. It is also possible to display Doppler images from the various beams plus just one of the multiple B-mode images, such as the most recent one.

Figure 7:
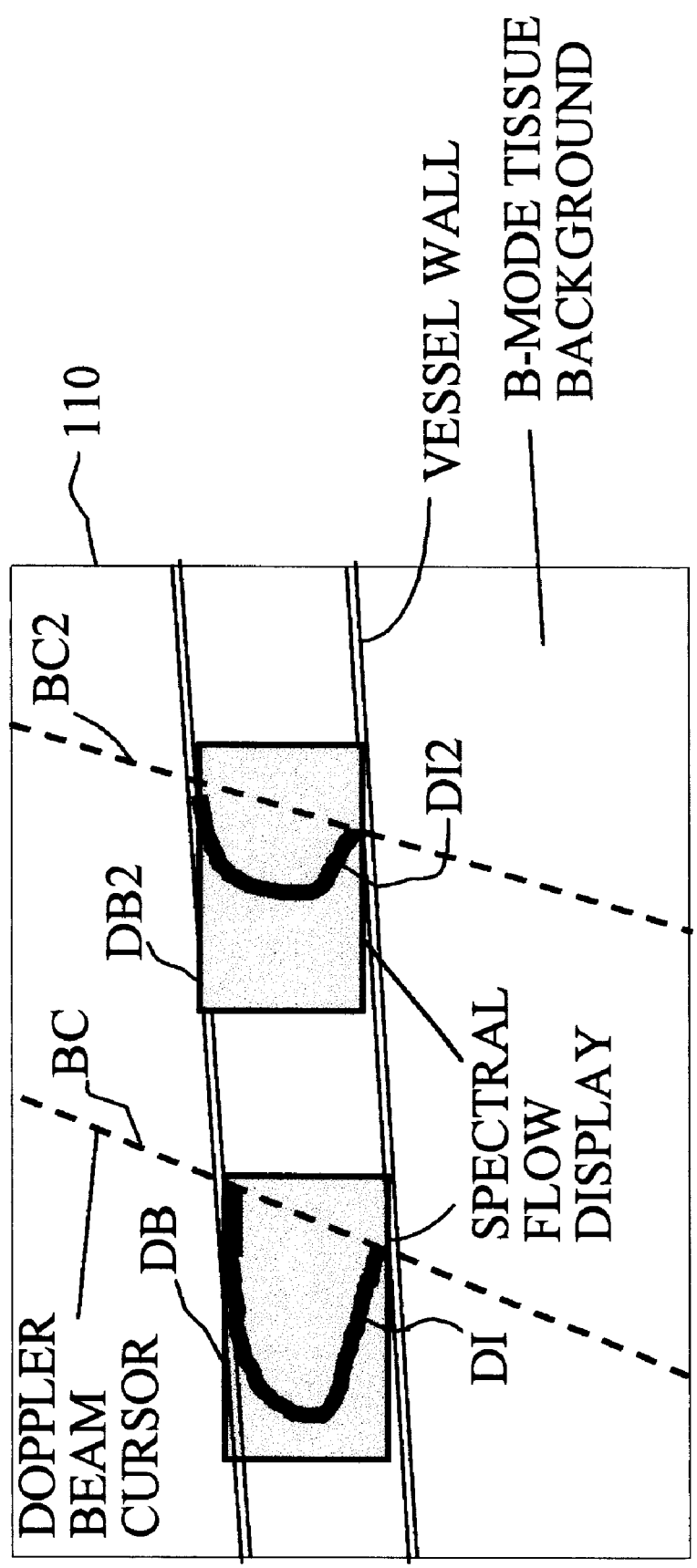
FIG. 7 is a schematic diagram illustrating a preferred form of display for an embodiment of the invention using two different transmit beams.

Referring to FIG. 7, another preferred display embodiment used in connection with two or more ultrasound beams may include a display image on the left side of display face 110 like the image shown in FIG. 4. As previously explained, in this display, a Doppler image is superimposed over a B-mode display for the first region of interest. On the right side of display face 110 is a second Doppler image superimposed over a second B-mode image. The second Doppler image is derived from the scanning of the second region of interest ROI 2 and the resulting Doppler frequency signals. The second B-mode image is derived from the scanning of the second region of interest ROI 2 and the resulting second B-mode data. The right side display results in a spectrum display box DB2, a Doppler beam cursor BC2 and a Doppler image DI2 arranged as shown. Depending on whether the firings of the two Doppler beams can be interleaved, the spectral flow images (and background B-mode image) may be displayed "live," or upon playback from buffer memories 32 and 34 in a synchronized manner based on a cardiac timing signal.

Those skilled in the art will recognize that the preferred embodiments may be altered and modified without departing from the true spirit and scope of the invention as defined in the accompanying claims. For example, processor 20 and computer 30 may be combined in a single logic unit.

What is claimed is:

1. In an ultrasound system, apparatus for acquiring and displaying Doppler and B-mode data from a subject under study comprising:

an ultrasound transmitter connected to transmit ultrasound waves into the subject under study;

a receiver connected to generate backscattered signals in response to the ultrasound waves backscattered from the subject under study;

a plurality of range gates responsive to the backscattered signals for generating a plurality of Doppler signal samples representing a predetermined range of depth increments within said subject;

a logic unit responsive to the Doppler signal samples to generate a plurality of Doppler frequency signals representing said range of depth increments, and responsive to said backscattered signals to generate B-mode data representing said range of depth increments; and a display responsive to said B-mode data to generate a B-mode image representing the portion of the subject within the range of depth increments and responsive to said Doppler frequency signals to generate a Doppler graph representing said Doppler frequency along a first axis and said range of depth increments along a second axis, the portion of the Doppler graph representing the range of depth increments being superimposed on the B-mode image representing the portion of the subject within the range of depth increments.

2. Apparatus, as claimed in claim 1, wherein said backscattered signals are received from a first region of interest within said subject resulting in said Doppler signal samples and from a second region of interest within said subject, wherein said logic unit generates said B-mode data in a first group of frames representing said first region of interest at a first frame rate and a second group of frames representing said second region of interest at a second frame rate less than said first frame rate.

3. Apparatus, as claimed in claim 1, wherein said ultrasound waves comprise a first Doppler beam directed to a first region of interest within said subject and a second Doppler beam directed to a second region of interest within said subject, wherein said backscattered signals comprise a first group of backscattered signals generated in response to the ultrasound waves backscattered from said first region of interest and a second group of backscattered signals generated in response to ultrasound waves backscattered from said second region of interest, wherein said plurality of Doppler signal samples comprise a first group of Doppler signal samples generated in response to said first group of backscattered signals and a second group of Doppler signals generated in response to said second group of backscattered signals, wherein said plurality of Doppler signal samples comprises a first plurality of Doppler frequency signals generated in response to said first group of Doppler signal samples and a second plurality of Doppler frequency signals generated in response to said second group of Doppler signal samples, and wherein said Doppler image comprises a first Doppler image generated in response to said first plurality of Doppler frequency signals and a second Doppler image generated in response to said second plurality of Doppler frequency signals.

4. Apparatus, as claimed in claim 3 wherein said B-mode data comprises first B-mode data responsive to said first group of backscattered signals and second B-mode data responsive to said second group of backscattered signals, and wherein said B-mode image comprises a first B-mode image generated in response to said first B-mode data and a second B-mode image generated in response to said second B-mode data.

5. Apparatus, as claimed in claim 4, wherein said first Doppler image is superimposed over said first B-mode image and wherein said second Doppler image is superimposed over said second B-mode image.

6. In an ultrasound system, a method for acquiring and displaying Doppler and B-mode data from a subject under study comprising:

transmitting ultrasound waves into the subject under study;

generating backscattered signals in response to the ultrasound waves backscattered from the subject under study;

generating a plurality of Doppler signal samples representing a predetermined range of depth increments within said subject in response to said backscattered signals;

generating a plurality of Doppler frequency signals representing said predetermined range of depth increments in response to said Doppler signal samples;

generating B-mode data for the range of depth increments in response to said backscattered signals;

generating a B-mode image representing the portion of the subject within the range of depth increments in response to said B-mode data; and displaying a Doppler graph representing said Doppler frequency along a first axis and said range of depth increments along a second axis in response to said Doppler frequency signals, the portion of the Doppler graph representing the range of depth increments being superimposed on the B-mode image representing the portion of the subject within the range of depth increments.

7. A method, as claimed in claim 6, wherein said backscattered signals are received from a first region of interest within said subject resulting in said Doppler signal samples and from a second region of interest within said subject, wherein said B-mode data is generated in a first group of frames representing said first region of interest at a first frame rate and a second group of frames representing said second region of interest at a second frame rate less than said first frame rate.

8. A method, as claimed in claim 1, wherein said ultrasound waves comprise a first Doppler beam directed to a first region of interest within said subject and a second Doppler beam directed to a second region of interest within said subject, wherein said backscattered signals comprise a first group of backscattered signals generated in response to the ultrasound waves backscattered from said first region of interest and a second group of backscattered signals generated in response to ultrasound waves backscattered from said second region of interest, wherein said plurality of Doppler signal samples comprise a first group of Doppler signal samples generated in response to said first group of backscattered signals and a second group of Doppler signals generated in response to said second group of backscattered signals, wherein said plurality of Doppler signal samples comprises a first plurality of Doppler frequency signals generated in response to said first group of Doppler signal samples and a second plurality of Doppler frequency signals generated in response to said second group of Doppler signal samples, and wherein said Doppler image comprises a first Doppler image generated in response to said first plurality of Doppler frequency signals and a second Doppler image generated in response to said second plurality of Doppler frequency signals.

9. A method, as claimed in claim 8, wherein said B-mode data comprises first B-mode data responsive to said first group of backscattered signals and second B-mode data responsive to said second group of backscattered signals, and wherein said B-mode image comprises a first B-mode image generated in response to said first B-mode data and a second B-mode image generated in response to said second B-mode data.

10. A method, as claimed in claim 5, wherein said displaying comprises superimposing said first Doppler image over said first B-mode image and superimposing said second Doppler image over said second B-mode image.

* * * * *